(12) United States Patent
Heiman

(10) Patent No.: US 9,434,843 B1
(45) Date of Patent: Sep. 6, 2016

(54) ONE-PART DRY ERASE PAINT

(71) Applicant: Michael Heiman, Lee's Summit, MO (US)

(72) Inventor: Michael Heiman, Lee's Summit, MO (US)

( * ) Notice: Subject to any disclaimer, the term of this patent is extended or adjusted under 35 U.S.C. 154(b) by 339 days.

(21) Appl. No.: 13/623,685

(22) Filed: Sep. 20, 2012

Related U.S. Application Data

(60) Provisional application No. 61/536,908, filed on Sep. 20, 2011.

(51) Int. Cl.
*C09D 5/00* (2006.01)
*B43L 1/00* (2006.01)

(52) U.S. Cl.
CPC . *C09D 5/00* (2013.01); *B43L 1/00* (2013.01); *B43L 1/002* (2013.01)

(58) Field of Classification Search
None
See application file for complete search history.

(56) References Cited

U.S. PATENT DOCUMENTS

| | | | |
|---|---|---|---|
| 4,235,766 A * | 11/1980 | Kuijper | 524/875 |
| 4,341,689 A * | 7/1982 | Doshi et al. | 523/211 |
| 5,741,849 A * | 4/1998 | Blum et al. | 524/591 |
| 2005/0112324 A1* | 5/2005 | Rosenbaum et al. | 428/141 |
| 2009/0148603 A1* | 6/2009 | Goscha | 427/256 |
| 2010/0004366 A1* | 1/2010 | Engelbrecht | C09D 7/125 524/320 |
| 2010/0092671 A1* | 4/2010 | Goscha et al. | 427/256 |
| 2011/0143330 A1* | 6/2011 | Shimada et al. | 434/408 |

OTHER PUBLICATIONS

Centimark Material Safety Data Sheet, Questmark 1357voc, Revised Jan. 2012, 4 pages.
Technical Data Questmark 1357VOC Moisture Cured Urethane, Mar. 2004, 2 pages.

\* cited by examiner

*Primary Examiner* — Erma Cameron
(74) *Attorney, Agent, or Firm* — Hovey Williams LLP

(57) ABSTRACT

One-pot, dry erasable paints are provided. The dry erasable paints can be used to prepare dry erase coatings on virtually any type of substrate surface. The paints comprise a base component comprising monomers, oligomers, and/or polymers of a diisocyanate mixed with an admix component comprising a solvent. The paints are cured in a time of less than about 12 hours under ambient conditions, and once cured are markable-erasable with numerous writing and marking instruments, including temporary and permanent markers, paint, crayons, ink, and the like.

13 Claims, 3 Drawing Sheets
(3 of 3 Drawing Sheet(s) Filed in Color)

ONE-PART DRY ERASE PAINT

CROSS-REFERENCE TO RELATED APPLICATIONS

The present application claims the priority benefit of U.S. Provisional Patent Application Ser. No. 61/536,908, filed Sep. 20, 2011, entitled ONE-PART DRY ERASE PAINT, incorporated by reference in its entirety herein.

BACKGROUND

1. Field of the Invention

The present disclosure relates to one-pot, dry erasable paints and surfaces.

2. Description of Related Art

There are few dry erase paints currently available. JML Products and Design offers a product containing photoinitiators, which requires UV curing to create the final markable-erasable surface. Two other available products (IdeaPaint and Rust-Oleum) are two-part, epoxy-based coatings that require combining two components immediately prior to the time of application. These epoxy-based products have a limited pot life. Furthermore, the epoxy-based products are typically available in white, and/or require sanding and/or the use of a primer before applying to a substrate. In addition, the cure time for Idea Paint is 168 hours, while the cure time for Rust-Oleum is 48 hours. These products are also only for indoor use. Thus, there remains a need in the art for improved dry erase paint products.

SUMMARY

The present disclosure is broadly concerned with a method of producing a dry erasable surface. The method comprises providing a one-pot, dry erase paint, providing a substrate having a surface, forming a coating of the paint mixture adjacent the substrate surface, and allowing the coating to dry under ambient conditions, wherein the dried coating has a surface that is markable-erasable. The one-pot, dry erase paint comprises a base component and an admix component mixed with the base component. The base component comprises monomers, oligomers, and/or polymers of diisocyanate, and the admix component comprises a solvent.

A dry erasable structure is also disclosed. The dry erasable structure comprises a substrate having a surface and a dry erasable coating adjacent the substrate surface. The dry erasable coating is formed from a dry erase paint comprising a base component and an admix component mixed with the base component. The base component comprises monomers, oligomers, and/or polymers of diisocyanate, and the admix component comprises a solvent.

A one-pot, dry erase paint is also provided. The dry erase paint comprises a base component and an admix component mixed with the base component. The base component comprises monomers, oligomers, and/or polymers of diisocyanate, and the admix component comprises a solvent. The paint has a one-pot shelf-life of at least about 12 months.

A method of making a dry erase paint is also provided. The method comprises mixing a base component with an admix component to yield the paint, and storing the paint in a sealed container. The base component comprises monomers, oligomers, and/or polymers of diisocyanate, and the admix component comprises a solvent. The paint has a one-pot shelf-life of at least about 12 months.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure (FIG.) 1 is a photograph of the dry erase coating in Example 3 showing the various markings made on the dried coating.

DETAILED DESCRIPTION

Figure 1:
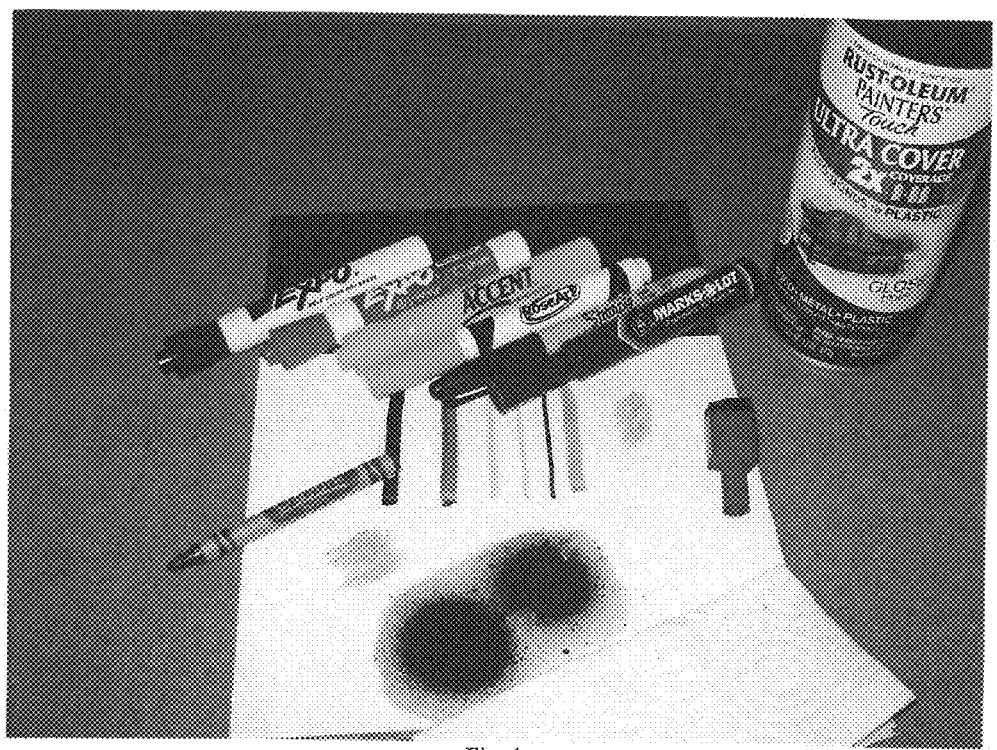

The present disclosure is concerned with dry erase (i.e., "markable-erasable") coatings, coated substrates, dry erase surfaces, and compositions to produce the same. The inventive compositions are one-part ("one-pot"), dry erase paints that do not require any special curing techniques, such as photoinitiated (e.g., UV) or heat curing. The inventive compositions are "one-part" or "one-pot," which means all ingredients or components of the composition are mixable in a single container without reacting such that the composition has an extended shelf-life even when mixed together, and thus can be provided to the end user as a one component composition in a single container. This is contrasted with conventional two-part (or multi-part) compositions which have "A" and "B" (and sometimes "C") elements provided in separate containers, and must be mixed on-site within specific ratio constraints, and used within a defined (typically short, i.e., less than 4 hour) period of time after mixing, since mixing the separate elements initiates the curing reaction. Thus, the inventive one-part compositions have the added benefit of being pre-mixed and ready-to-use for the end user, and do not have to be mixed or prepared on-site, but can simply be applied to the desired substrate to form the dry erase surface. The compositions comprise a crosslinkable base component dispersed or dissolved in an admix component.

In one aspect, the base component comprises a urethane-based resin composition, and preferably a high solids (>30% by weight), urethane-based resin composition preferably formulated for abrasion resistance, chemical resistance, stain resistance, UV-stability, and/or flexibility. In some embodiments, the base component is a solvent-borne urethane, and in other embodiments, the base component is a water-borne urethane. Preferred urethane-based resins suitable for use in the invention will typically comprise an aliphatic isocyanate, and particularly a diisocyanate, such as hexamethylene diisocyanate (HDI), hexane diisocyanate, and/or isophorone diisocyanate (IPDI). In some embodiments, aromatic isocyanates may be used, such as toluene diisocyanate (TDI) and/or methylene diphenyl diisocyanate (MDI). Isocyanate prepolymers can also be used to prepare the urethane base component, and in some cases are preferred for the base component. The isocyanate will typically be provided in the composition along with a suitable polyol or compound providing a multi-functional alcohol during the curing reaction, such as the hardeners and crosslinking agents discussed below. Urethane coatings can be classified as reactive or non-reactive. In some embodiments, curing of the coating involves the isocyanate group of the urethane base component ("reactive"), and in other embodiments, curing does not involve the isocyanate group ("non-reactive;" i.e., the isocyanate group has already been reacted). Reactive urethanes are preferred in some aspects of the invention. In some embodiments, the base component is a single component moisture-cure type urethane. In some embodiments, the base component is a single component oxygen-cure (crosslinking) type urethane.

In some embodiments, the base component comprises monomers, oligomers, and polymers of a diisocyanate (e.g., HDI) dispersed or dissolved in a solvent system (aqueous or non-aqueous). Other resins can be included in the base composition such as cellulose esters (e.g., cellulose acetate butyrate ester), acrylic resins, and the like. In some embodiments, the base component can further comprise one or more solvents such as xylene, N-butyl acetate, aromatic petroleum distillates, methyl N-amyl ketone, 1,2,4-trimethylbenzene, naphtha light aromatic, 2,6-dimethyl-4-heptanone, isopropylbenzene, and/or ethyl benzene, as well as catalysts such as dibutylin dilaurate. In some embodiments, the base component can further comprise one or more solvent such as water, glycol ethers (e.g., propylene based glycol ether), tripropylene n-butyl ether, and the like. Alternatively, such solvents can be provided as part of the admix discussed below. For example, in some embodiments, the base component is provided as a high solids composition primarily comprising resins, fillers, and/or other solids, and is substantially free of added solvents or catalysts. In some embodiments, suitable thickening agents can be included in the base component such as polyethyleneglycol distearate, palmiates, oleates, stearates and laurates, as well as vinyl alcohol copolymers and polyvinyl pyrrolidone. Alternatively such thickening agents can be added as part of the admix.

In one aspect, the admix component is a suitable solvent or mixture thereof. Exemplary VOC-exempt solvents are selected from the group of current EPA (or other agency) listed VOC-exempt solvents, such as those consisting of acetone, parachlorobenzotrifluoride (PCBTF; e.g., Oxsol 100®), t-butyl acetate (TBA), propylene carbonate, volatile methyl siloxanes, methylene chloride, and mixtures thereof. It will be appreciated that the solvents should be selected to have with negligible photochemical reactivity and be compatible with the base backbone or other additives. Additional suitable solvents include methyl chloroform, 1,1,2-trichloro-1,2,2-trifluoroethane (CFC-113), trichlorofluoromethane (CFC-11), dichlorodifluoromethane (CFC-12), chlorodifluoromethane (HCFC-22), trifluoromethane (HFC-23) 1,2-dichloro1,1,2,2-tetrafluoroethane (CFC-114), chloropentafluoroethane (CFC-115), 1,1,1-trifluoro2,2-dichloroethane (HCFC-123), 1,1,1,2-tetrafluoroethane (HCFC-134a), 1,1-dichloro-1-fluoroethane (HCFC-141b), 1-chloro-1,1-difluoroethane (HCFC-142b), 2-chloro-1,1,1,2-tetrafluoroethane (HCFC-124), pentafluoroethane (HFC-125), 1,1,2,2-tetrafluoroethane (HFC-134), 1,1,1-trifluoroethane (HFC-143a), 1,1-difluoroethane (HFC-152a), cyclic, branched, or linear completely methylated siloxanes, perchloroethylene (tetrachloroethylene), 3,3-dichloro-1,1,1,2,2-pentafluoropropane (HCFC-225ca), 1,3-dichloro-1,1,2,2,3-pentafluoropropane (HCFC-225cb), 1,1,1,2,3,4,4,5,5,5-decafluoropentane (HFC-43-10mee), difluoromethane (HFC-32), ethylfluoride (HFC-161), 1,1,1,3,3,3-hexafluoropropane (HFC-236fa), 1,1,2,2,3-pentafluoropropane (HFC-245ca), 1,1,2,3,3-pentafluoropropane (HFC-245ea), 1,1,1,2,3-pentafluoropropane (HFC-245eb), 1,1,1,3,3-pentafluoropropane (HFC-245fa), 1,1,1,2,3,3-hexafluoropropane (HFC-236ea), 1,1,1,3,3-pentafluorobutane (HFC-365-mfc), chlorofluoromethane (HCFC-31), 1-chloro-1-fluoroethane (HCFC-151a), 1,2-dichloro-1,1,2-trifluoroethane (HCFC-123a), 1,1,1,2, 2,3,3,4, 4-nonafluoro-4-methoxy-butane ($C_4F_9OCH_3$), 2-(difluoromethoxymethyl)-1,1,1,2,3,3,3-heptafluoropropane (($CF_3$)$_2CFCF_2OCH_3$), 1-ethoxy-1,1,2,2,3,3,4,4,4-nonafluorobutane ($C_4F_9OC_2H_5$), 2-(ethoxydifluoromethyl)-1,1,1,2, 3,3,3-heptafluoropropane (($CF_3$)$_2CFCF_2OC_2H_5$), methyl acetate, and perfluorocarbon compounds which fall into these classes: (i) cyclic, branched, or linear, completely fluorinated alkanes; (ii) cyclic, branched, or linear, completely fluorinated ethers with no unsaturations; (iii) cyclic, branched, or linear, completely fluorinated tertiary amines with no unsaturations; and (iv) sulfur containing perfluorocarbons with no unsaturations and with sulfur bonds only to carbon and fluorine.

Additional ingredients that can be included in the composition include fluorocarbons, fluoropolymers, silicones, silica derivatives, defoaming agents, polypropylene, cross-linking agents and hardeners, chain extenders, catalysts, surfactants, flame retardants, blowing agents, pigments (e.g., titanium dioxide), fillers, and mixtures thereof. Exemplary crosslinking agents and hardeners include oxazolidines (e.g., Incozol 4), para-toluene sulfonylisocyanate (VanDeMark), silanes, synthetic zeolite (Zeolum CGS IV), synthetic amorphous silica (Gasil 200DF), and the like. Incozol 4 is a bis-oxazolidine latent hardener that hydrolyzes on exposure to moisture, yielding a reactive amine and hydroxyl functional cross-linking agent. It also confers tolerance to repeated opening of containers. Incozol 4 also acts as a moisture scavenger and drying agent, and is a particularly preferred hardener. Silanes, synthetic zeolite (Zeolum CGS IV), synthetic amorphous silica (Gasil 200DF) could also be used in lieu of or in addition to Incozol 4. Exemplary catalysts include dimethyltin dineodecanoate, or any other catalyst suitable for catalyzing polyurethane reactions based on aliphatic isocyanates, such as dibutylin dilaurate listed above.

The foregoing additives can be included in the base component or added to the base component with the admix to achieve various properties in the final composition. In some embodiments, the composition is substantially free of epoxies, and/or photoinitiators. The term "substantially free" is used herein to indicate that a particular ingredients or component is not present in a significant amount and is not purposefully added to impart a certain characteristic to the composition (as contrasted with intentional ingredients mentioned herein), it being understood that incidental amounts of an ingredient may find their way into the composition or be included in such small amounts so as to not affect the overall character of the composition. More specifically, substantially free refers to amounts of less than about 0.1% by weight, preferably less than about 0.01% by weight, and more preferably about 0% by weight, based upon the total weight of the composition taken as 100% by weight.

If the base component is in liquid or gel form, the composition can be prepared by simply mixing the admix (and any other ingredients) into the base component until a homogenous composition is formed. If the base component is in a solid or semisolid form, and not soluble in the admix solvent, the base component can be heated to liquify the component, followed by mixing in the admix (and any other additives) as described above until substantially blended together in a homogenous composition. In some aspects, the base component is heated to a temperature of from about 150 to about 200° F., more preferably from about 160 to about 190° F., and even more preferably from about 175 to about 185° F. to liquify the base before mixing with the admix, based upon the amount and density of the base component.

The level of admix used will depend upon the solvent content of the base component itself. In some embodiments where the base component also comprises a solvent, the admix is added at a level of from about 5 to about 60%, preferably from about 10 to about 30%, more preferably from about 15 to about 20% by weight, and even more preferably from about 15 to about 18% by weight, based upon the total weight of the composition taken as 100% by weight. In some aspects, the maximum range for use and production is at a ratio of admix to base of about 1:4+/−10%. In some embodiments where the base component itself is substantially free of solvent, the admix is added at a level of from about 30% to about 50%, preferably from about 40% to about 50%, and even more preferably from about 45 to about 47% by weight, based upon the total weight of the composition taken as 100% by weight. The total solids in the composition will typically be from about 30% to about 100% by weight, preferably from about 35% to about 70% by weight, and more preferably from about 40% to about 60% by weight, and even more preferably from about 53% to about 60% by weight, based upon the total weight of the composition taken as 100% by weight.

In some embodiments, a drying agent may be added to the composition to remove excessive moisture from the composition (added by the admix solvent or from solvents in the base component). This can be particularly important if the base component comprises a moisture cure urethane. In some embodiments, the admix solvent adds a negligible amount of moisture, or has been sufficiently dried prior to being added to the composition, such that a drying agent is not necessary or desired, in which case the composition is substantially free of any added drying agents added to the mixed composition.

The composition once mixed can be stored in an appropriate container sealed under vacuum or capped with an inert gas (e.g., nitrogen) to maintain its shelf-storage stability and inhibit reaction with ambient moisture in the air. The composition will have an unopened shelf-life of at least about 3 months, preferably at least about 6 months, and more preferably at least about 12 months. The term "shelf-life" refers to the length of shelf-storage stability of the composition after which it can still be used to create the dry erase coatings. For best shelf-life, the product should be stored at 40-50% humidity, with stable temperatures from 50° F. to 95° F. Longer shelf life can be attained by placing the composition is a non-reactive pliable container, such as a polypropylene (#5) bag, removing all or most air, and securing the container closed. Other methods of extending shelf life include vacuuming out the air in the container, capping with an inert gas (like nitrogen) or repackaging into a container close to the remaining volume, thereby reducing humidity moisture in the headspace of the container. Once opened, and then resealed the shelf-life of the resealed composition will be at least about 1 month, preferably at least about 6 months, and more preferably about 12 months, depending upon the resealing technique used (i.e., the amount of air evacuated from the container before resealing).

In use, the composition is applied to a substrate surface. Suitable substrates include any horizontal, vertical, or non-planar shaped surface to which a coating can be applied. The substrate may be comprised of various materials, or may be coated with various materials including wood, plexiglass, dry wall, painted surfaces, plastic, glass, melamine coatings (including existing dry erase surfaces), metal, slate, porcelain, ceramic, enameled surfaces, composite, and the like. For example, the inventive dry erase coating can be applied to surfaces such as floors, walls, ceilings, desktops, dry erase boards, chalkboards, windows, furniture (e.g., refrigerators, cabinets, etc.) extruded plastic shapes, and the like. Advantageously, the substrate does not need to be primed, sanded, or otherwise roughened or prepped before applying the coating composition. The composition can be applied using any suitable technique, including rolling, brushing, spraying, dipping, pouring, dragging, or pulling the composition onto and over the substrate surface, and the like. In some embodiments, the composition is applied at a rate of from about 0.15 oz/ft$^2$ to about 0.4 oz/ft$^2$, and preferably from about 0.18 to about 0.3 oz/ft$^2$ to produce even coverage while maximizing product usage. Multiple coats can be used to achieve the desired level of thickness. The number of coats required will depend upon the particular formulation used and the level of evaporation of the solvents utilized, as well as the thickness of each coat applied, the porousness, and texture of the substrate. In some embodiments, 1 to 3 coats are used, and preferably 2 to 3 coats are used. For example, 16 ounces of the composition will cover about 28 square feet at 2-3 coats. Likewise, 32 ounces of the composition will cover about 60 square feet at 2-3 coats.

In some cases, if the evaporation is very quick on the top of the coating, yet slower on the bottom of the coating a thinner coating may be used to eliminate bubbling or other undesirable coating imperfections during curing of the layer. In such case, subsequent coats may be needed to achieve the desired final thickness of the dry erase paint. If the solvent evaporation rate allows the product to cure without forming bubbles or surface variations, then a single coat can be applied. In some aspects, it may be desirable to seal the substrate surface using a very thin coating of the dry erase composition followed by subsequent coats to form the dry erase coating. In any event, the final coating thickness will be sufficiently thick to keep markings from penetrating down into the substrate. In some aspects, the final average thickness will range from about 1 mL to about 6 mL, preferably from about 2 mL to about 5 mL, and more preferably from about 3 mL to about 4 mL.

The viscosity of the composition is balanced so that it does not drip or sag when applied on a vertical surface, even with multiple coats, but also does not dry too quickly. It is also self-leveling and will planarize slight imperfections in the substrate surface. The cured coating is abrasion resistant, chemical resistant, and resistant to staining from permanent markers, inks, and/or paints, and the like.

The coating is then allowed to dry and cure without any special curing treatments or application of additional coatings (such as conditioners or the like). In other words, UV or heat curing is not used, and the coating is dried under ambient conditions (i.e., 22° C.+/−3° C. and 50% humidity +/−10%). In addition, a top coat is not necessary to achieve the markable-erasable surface. In some aspects, the coatings will be allowed to dry (until dry-to-the-touch) for a time period of from about 10 minutes to about 24 hours, preferably from about 20 minutes to about 12 hours, and more preferably from about 20 minutes to about 35 minutes between coatings. Advantageously, the coating will be sufficiently dry to write or mark upon in about 10 minutes in some aspects. Typically, the coating will be suitable for marking upon in less than about 24 hours, more preferably less than about 12 hours, and even more preferably less than about 7 hours after application of the last coating layer. It will be appreciated that the cure time required to achieve the markable-erasable property of the coating will depend to a certain extent on the type of marking instrument desired to be used. For example, dry erase marker makings are typically removable if applied after only 3 hours of curing, while a permanent marker may only be removable if applied after allowing the coating to cure for 3 days.

In some aspects, it may be desirable to infuse a permanent image or marking onto the coating. In this case, the coating can be marked upon during curing before being fully cured. Such a marking will become a permanent part of the dry erase surface, and can be achieved using direct writing, ink transfers, or the like. Typically, the infused marking is achieved by marking on the coating surface about 10 minutes to about 1 hour after applying the coating (while the coating is still tacky).

The inventive coatings are markable-erasable (removable) with a variety of marking instruments, including dry erase markers and pens, permanent markers, crayons, highlighter markers, washable markers, regular markers, pencils (e.g., lead pencils, graphite pencils), paints (e.g., spray paint, finger paint), make-up (e.g., lipstick), pens (e.g., grease pens, gel pens, ink pens), grease pencils, as well as adhesives such as glue, tape, and stickers. The terms "dry erase," "dry erasable," "markable-erasable," and the like, are used herein to refer to the cured or dried coating's surface property of being markable or writeable with typical writing and marking instruments to create legible words, letter, images, and the like, but such writings and markings can be removed from the coating surface without the use of solvents, cleaners or other "wet" removal methods (i.e., can be removed simply by wiping with a dry cloth, eraser, or the like).

The cured coatings are also resistant to various solvents and cleaners that may be used on the surface, including aqueous solutions and/or water, glass cleaner (Windex®), isopropyl alcohol, xylene and acetone (as found in products like Goof-Off®), and other such chemicals and cleaners. Thus, unlike conventional dry erase boards, such cleaners can be used to clean and remove any persistent or unknown markings that may get on the inventive dry erase coating. The surface will maintain its markable-erasable attributes (or recover its attributes) while allowing the markings to be removed from the surface.

The inventive coatings also have the appropriate balance of softness (flexibility) versus hardness (non-poracity). In particular, the coatings are not so soft that an eraser or cleaning cloth drags on the surface, inhibiting a smooth erasing experience. However, the coatings are also not too hard such that they crack or create a cracked image. The inventive coatings can be formulated as either glossy or with a flat sheen depending upon the additives. For example, dullers, powders, and/or granules, can be added to the composition to achieve a semi-gloss or matte finish.

In some aspects, the inventive coatings are substantially transparent, which means that they have a % light transmittance of at least about 70%, preferably at least about 80%, and more preferably at least about 90% in the visible range (400-700 nm). Thus, the inventive coatings can be applied over existing painted surfaces to create markable-erasable surfaces of virtually any color, or with images underneath, including, for example, graph lines, logos, other graphics, and the like. For a freshly painted surface, the inventive coatings are advantageous because they have sufficient porosity to allow the underlying non-dry erase paint layer to off-gas through the dry erase layer so that it cures correctly and does not adversely affect the dry erase layer. However, as noted above, the porosity is balanced so that the dry erase layer provides a sufficient barrier between the substrate surface to avoid permanent marking of the substrate.

In some embodiments, the inventive coatings can further comprise pigments or dyes, such as titanium dioxide, and the like. Depending upon the level of pigment, the coatings can range from substantially opaque (% transmittance of less than about 10% and preferably about 0%) to translucent (% transmittance ranging from 10% to 70%).

The inventive coatings are suitable for indoor and outdoor use, which means they are resistant to degradation or deterioration from the elements such as rain, snow, sun, and the like. Unlike conventional epoxy-based and UV cure dry erase boards that amber under UV exposure, the embodiments of the invention do not experience the UV/amber issue. In some aspects, UV inhibitors can be included in the compositions to further reduce yellowing of the coating from sun exposure. The inventive coatings are also easily repairable. This means that any defects or damage in the coating can be easily repaired by simply applying one or more coatings of the inventive paint to the damaged portion, and does not require the damaged portion to be primed, or sanded before making the repair.

Additional advantages of the various embodiments of the disclosure will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth methods in accordance with the invention. It is to be understood, however, that these examples are provided by way of illustration and nothing therein should be taken as a limitation upon the overall scope of the invention.

Example 1

Dry Erase Paint Formulation I

A dry erase paint composition was formulated using an acetone admix and a moisture cured urethane base (ARM356PAVOCX, AmorPoxy, Union, N.J.) comprising hexamethylene diisocyanate (HDI), homopolymer of HDI, xylene, n-butyl acetate, dibutylin dilaurate, methyl n-amyl ketone, and ethyl benzene. In a mixing container, 50 gallons of the urethane base was mixed with 10 gallons of acetone until a substantially homogenous mixture was formed. The resulting dry erase paint was applied to a vertical substrate surface and allowed to air dry for 7 hours under ambient conditions (~25° C.). The dried surface was tested for dry erasability using conventional dry erase markers. The surface was then tested with other marking instruments, including permanent markers, spray paint, crayons, regular markers at various time points. Except for the permanent marker, each of the markings could be easily wiped from the surface of the dry erase paint coating using a dry cloth at 12 hours, with maximum results seen at 3 hours. The permanent marker was easily removed by moistening the marking with isopropyl alcohol.

Example 2

Dry Erase Paint Formulation II

A dry erase paint composition was formulated using a urethane prepolymer base (PP 45A) and an admix comprising Incozol 4, dimethyltin dineodecanoate (Fomrez UL 28), propylene carbonate, and t-butyl acetate (TBA). Besides bis-oxazolidine, silanes perform this function, synthetic zeolite (Zeolum CGS IV) and synthetic amorphous silica (Gasil 200DF), as well as others. The urethane base was heated to a temperature of about 185° F. to liquify the base, along with the addition of TBA to maintain room temperature liquidity after the heat was removed. The remaining ingredients were mixed into the solution until a substantially homogenous formulation was prepared. The ingredient amounts are provided in the table below.

TABLE

| Formulation II | |
|---|---|
| Ingredient | Amount (% by weight) |
| Urethane base | 52.8 |
| Incozol 4 | 15.4 |
| UL 28 (catalyst) | 0.2 |
| Propylene Carbonate | 9.3 |
| TBA | 22.3 |
| Totals: | 100 |

The resulting dry erase paint was applied to a vertical substrate surface and dried in 2 hours 12 minutes under ambient conditions (~25° C.). The dried surface was successfully tested for dry erasability using conventional dry erase markers and dry erasers. The surface was then tested with other marking instruments, including permanent markers, spray paint, crayons, regular markers, and highlighters. Each of the markings could be easily wiped from the surface of the dry erase paint coating using a dry eraser (and no solvent or cleaner). The permanent marker was easily removed by moistening the marking with isopropyl alcohol.

Example 3

Dry Erase Paint Formulation III

A dry erase paint composition was formulated using a urethane prepolymer base (APU 16; SuperSkin Systems, Atlanta, Ga.) and an admix comprising Incozol 4, UL 28, and TBA. The ingredients were mixed together at room temperature until a substantially homogenous formulation was prepared. The ingredient amounts are provided in the table below.

TABLE

| Formulation III | |
|---|---|
| Ingredient | Amount (% by weight) |
| Urethane prepolymer base Hexane 1,6 diisocyanate (50%) Hexamethylene diisocyanate (50%) | 53.57 |
| Incozol 4 | 16.97 |
| UL 28 | 0.22 |
| TBA | 29.24 |
| Totals: | 100 |

Figure 2:
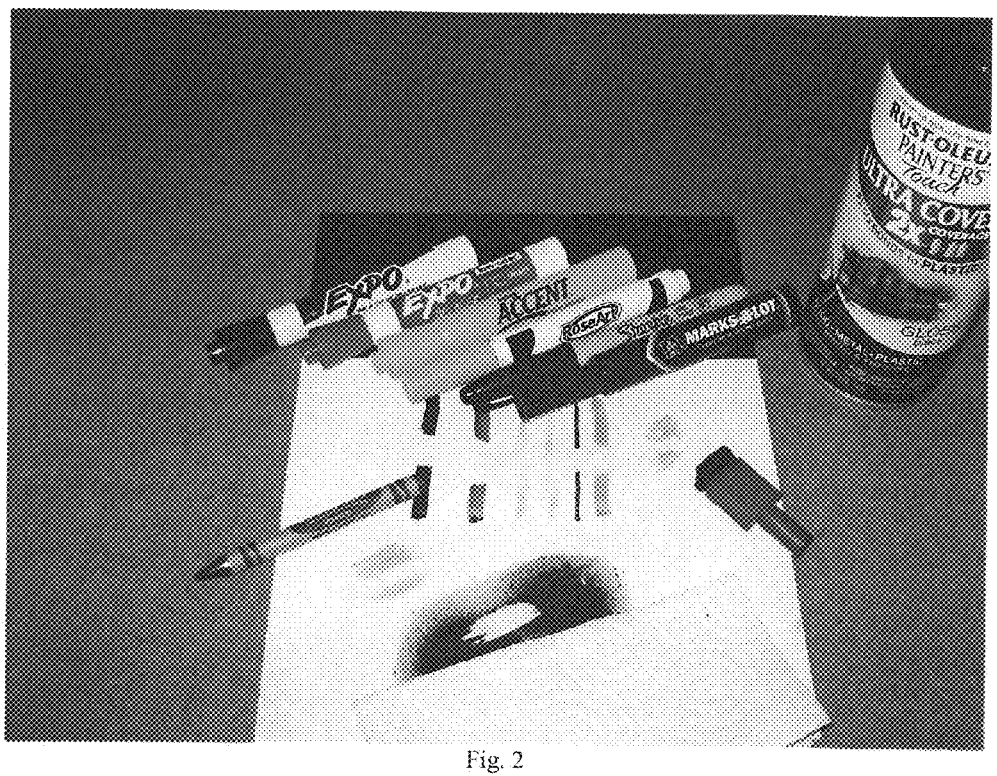
FIG. 2 is a photograph of the marked-upon dry erase coating from FIG. 1, showing the markings partially removed using a felt dry eraser.
Figure 3:
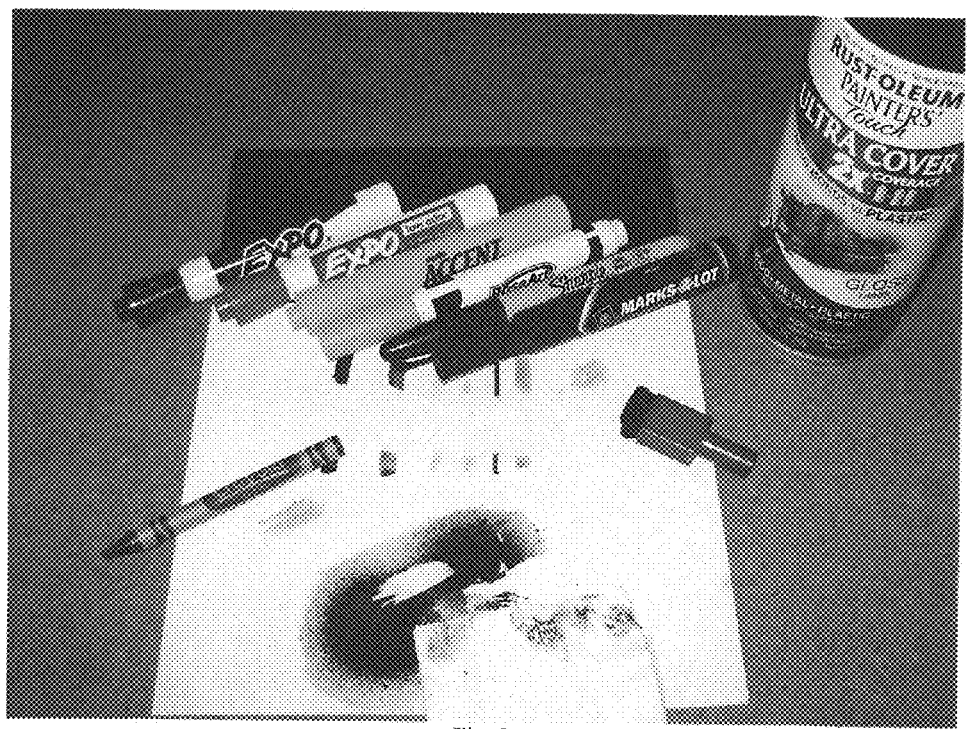
FIG. 3 is a photograph of the marked-upon dry erase coating from FIG. 1, showing the markings further removed using a dry paper towel.

The resulting dry erase paint was applied to a vertical substrate surface and allowed to air dry for 18 hours under ambient conditions (~25° C.). The dried surface was tested for dry erasability using conventional dry erase markers. At 23 hours and 55 minutes, the surface was then tested with other marking instruments, including permanent markers, spray paint, crayons, regular markers, and highlighters. (FIG. 1) Each of the markings could be easily wiped from the surface of the thy erase paint coating. FIGS. 2-3 show photographs of the removal of various markings from the dry erase surface using a dry felt eraser and a dry paper towel.

The invention claimed is:

1. A method of producing a dry erasable surface, said method comprising:
    providing a one-pot, dry erase paint comprising a base component and an admix component mixed with the base component, said base component comprising monomers, oligomers, and/or polymers of a diisocyanate, said admix component comprising a solvent, wherein said paint comprises a total solids content of greater than about 53% by weight and less than about 100% by weight;
    providing a substrate having a surface;
    forming a coating of said paint mixture adjacent said substrate surface; and
    allowing said coating to dry under ambient conditions and without the use of UV curing, wherein said coating has a surface, said coating surface being markable-erasable.

2. The method of claim 1, said solvent being selected from the group consisting of acetone, parachlorobenzotrifluoride, t-butyl acetate, propylene carbonate, volatile methyl siloxanes, methylene chloride, and mixtures thereof.

3. The method of claim 1, said solvent being selected from the group consisting of water, glycol ethers, tripropylene n-butyl ether, and mixtures thereof.

4. The method of claim 1, said diisocyanate being selected from the group consisting of hexamethylene diisocyanate, hexane diisocyanate, toluene diisocyanate, methylene diphenyl diisocyanate, isophorone diisocyanate, and mixtures thereof.

5. The method of claim 1, wherein said substrate is selected from the group consisting of wood, plexiglass, dry wall, painted surfaces, plastic, glass, melamine coatings, metal, slate, porcelain, ceramic, enameled surfaces, and composite.

6. The method of claim 1, wherein said coating is formed by rolling, brushing, spraying, dipping, pouring, dragging, or pulling the composition onto or over the substrate surface.

7. The method of claim 1, wherein said substrate surface is not sanded or primed prior to said forming.

8. The method of claim 1, wherein said dry erase paint is substantially free of epoxies and/or photoinitiators.

9. The method of claim 1, wherein said coating is markable-erasable less than about 12 hours after said forming.

10. The method of claim 1, wherein said coating is substantially transparent.

11. The method of claim 1, wherein said coating further comprises a pigment or a dye.

12. The method of claim 1, wherein said coating is markable-erasable with dry erase markers, dry erase pens, permanent markers, crayons, highlighter markers, washable markers, regular markers, glues, spray paints, make-up, pencils, grease pencils, grease pens, finger paints, and adhesives without a solvent or cleaner.

13. The method according to claim 1, said paint having a shelf-life of at least about 12 months when stored in a sealed container prior to said forming step.

\* \* \* \* \*